Sept. 8, 1931. A. K. STOHL 1,822,066
POWER TRANSMISSION MECHANISM
Filed July 25, 1930   2 Sheets-Sheet 1
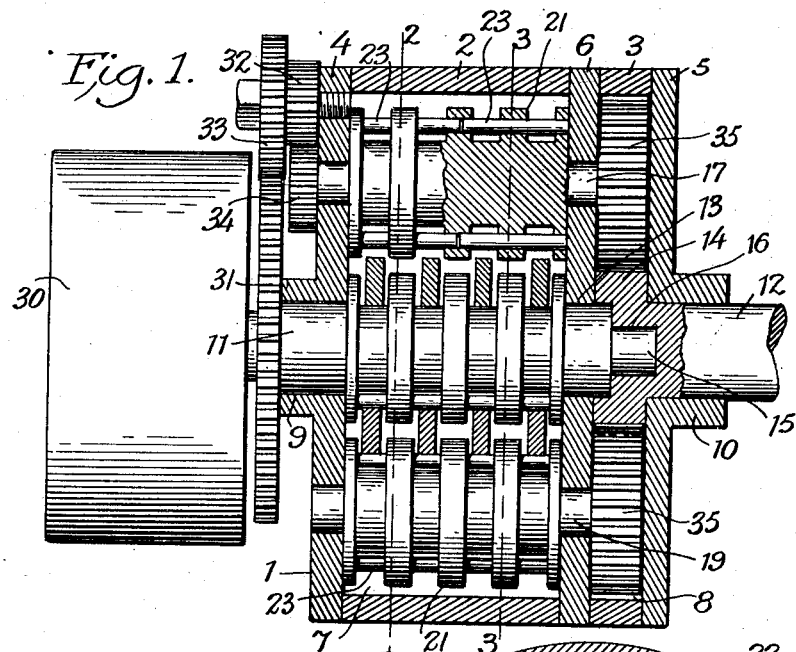
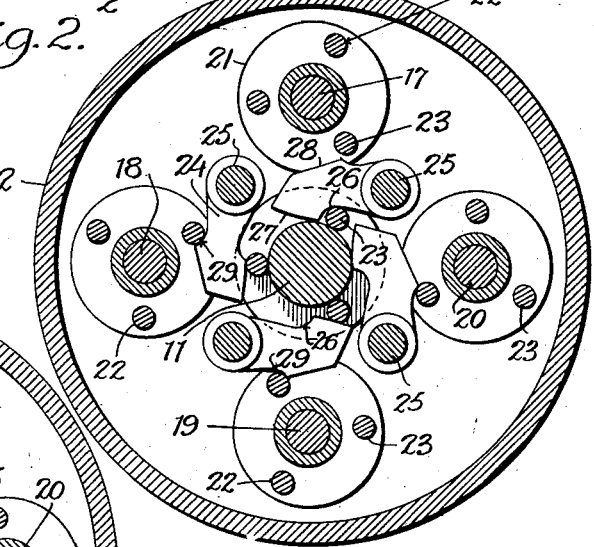
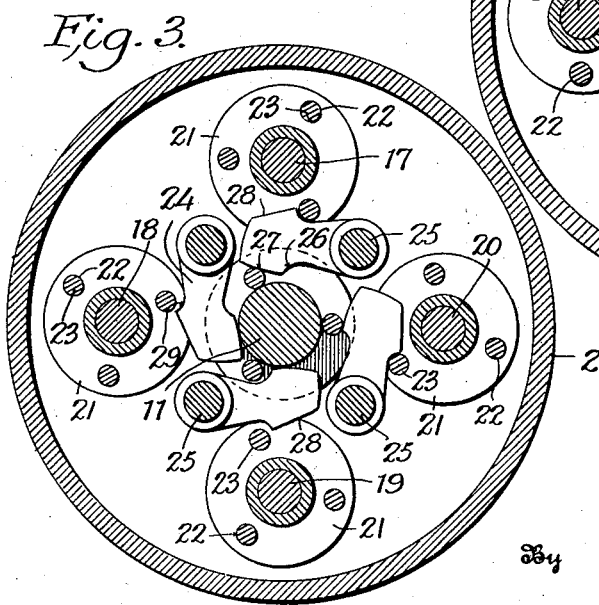
Inventor
Andrew K. Stohl,
By Sept. 8, 1931.  A. K. STOHL  1,822,066

POWER TRANSMISSION MECHANISM

Filed July 25, 1930  2 Sheets-Sheet 2

Inventor
Andrew K. Stohl,

By  
Attorney

Patented Sept. 8, 1931

1,822,066

UNITED STATES PATENT OFFICE

ANDREW K. STOHL, OF WATERBURY, CONNECTICUT, ASSIGNOR TO STOHL SUPER POWER CORPORATION, OF FAIR HAVEN, VERMONT, A CORPORATION OF VERMONT

POWER TRANSMISSION MECHANISM

Application filed July 25, 1930. Serial No. 470,703.

This invention relates to power transmission mechanisms of that type disclosed in my prior application filed March 24, 1930, Serial No. 438,421, in which there is employed mechanism for transmitting power from a drive shaft to a driven shaft in such manner as to effect a double driving action from one shaft to the other through a positive and continuous driving connection between the shafts and also through an intermittent or periodic driving connection between the shafts; and in which the driving connections, in the form of regularly movable cam levers and rotary cranks are provided for the intermittent or periodic drive action.

One object of the present invention is to provide a power mechanism of the character described embodying a novel construction of intermittent power transmitting devices of which a plurality are employed, at regular points in each cycle of action of the gearing for obtaining a uniform and continuous transmission of power.

A further object of the invention is to provide a transmission gearing in which the shafts carrying the crank pins are of novel construction to provide for the mounting of all the crank pins of a group of crank gears.

A still further object of the invention is to provide a power mechanism in which the cam levers or dogs are so constructed and so coact with the crank pins of the crank gears that each dog on each working action transmits motion to the two crank gears simultaneously, thereby securing increased uniformity of transmission of power.

With these and other objects in view, the invention consists of the features of construction, combination and arrangement of parts, hereinafter fully described and claimed, reference being had to the accompanying drawings, in which:—

Fig. 1 is a view in longitudinal section, in the plane of the driving and driven shafts, through one form of power transmission mechanism embodying my invention.

Fig. 2 is a transverse section on line 2—2 of Fig. 1, showing the power shaft and one set or group of the crank gears and cam levers for transmitting motion from said shaft to the driven shaft, such view showing certain positions of the dogs of the group.

Fig. 3 is a transverse section similar to Fig. 2 taken, for example, on line 3—3 of Fig. 1, showing another group of crank gears and cam levers in the relative position they occupy with respect to the corresponding parts shown in Fig. 2 at the same point in the orbit of rotation of the driving shaft.

Figure 6:
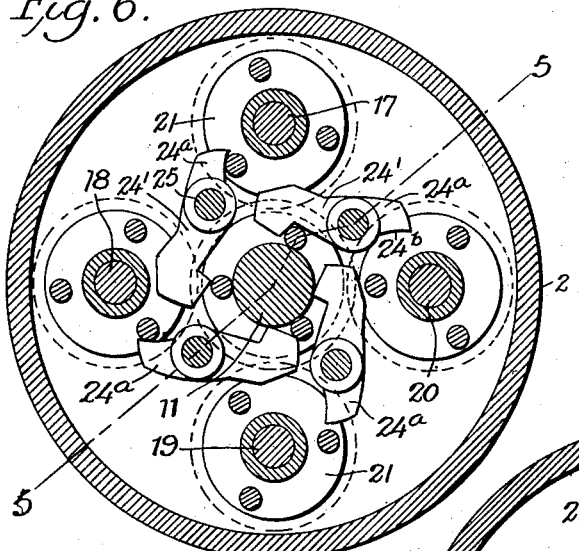
Figure 4:
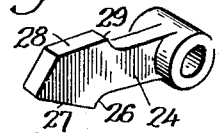
Fig. 4 is a perspective view of one of the cam levers or dogs shown in Figs. 1, 2 and 3.
Figure 8:
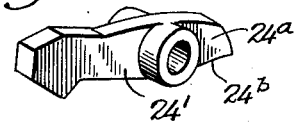
Figure 7:
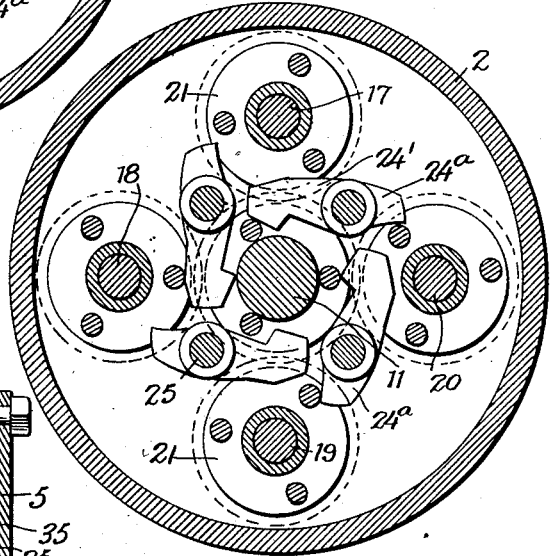
Figure 5:
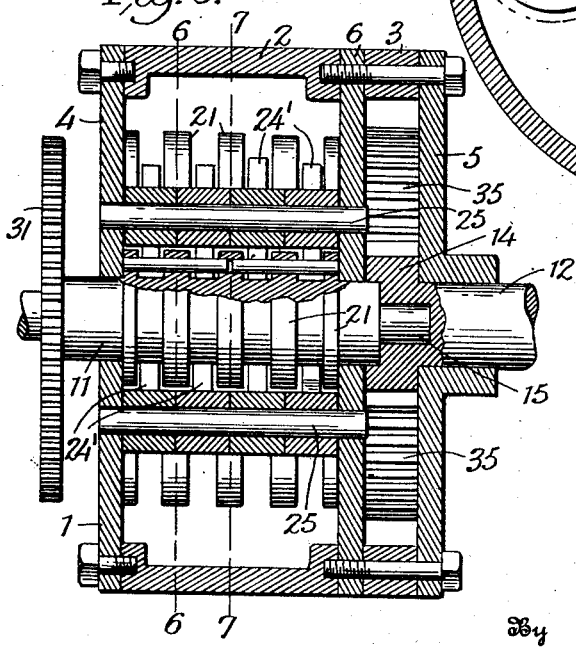
Fig. 5 is a longitudinal section, similar to Fig. 1, through a modified form of the power transmitting mechanism, taken, for example, on the line 5—5 of Fig. 6.

Figs. 6 and 7 are transverse sections similar to Figs. 2 and 3 and taken, for example, on the lines 6—6 and 7—7 of Fig. 5, showing different groups of crank gears and cam levers or dogs and their relative working positions.

Referring now more particularly to Figs. 1 to 4, inclusive, of the drawings, 1 designates generally the casing of the transmission mechanism, which comprises a pair of cylindrical members 2 and 3 and front, rear and intermediate closure plates or disks 4, 5 and 6, the plates 4 and 5 respectively closing the front side of the cylinder 2 and the casing 5 the rear side of the cylinder 3, while the plate 6 forms a closure for the opposite or relatively inner sides of said cylinders and acts as a division plate separating the chambers 7 and 8 formed thereby from each other. The parts 2, 3, 4, 5 and 6 may be detachably connected by machine screws or other suitable fastening devices.

The plates 4 and 5 are respectively provided with bearings 9 and 10 for a drive shaft 11 and a driven shaft 12. The shaft 11 extends through the bearing 9 into the chamber 7 and also into the chamber 8 through a bearing opening 13 in the plate 6, while the shaft 2 extends through the bearing into the chamber 8 and is provided with an enlarged portion 14 within the latter. As shown in the present instance, the rear end of the shaft 11 is provided with a reduced portion 15, and such end of the shaft and its reduced portion 15 fit within a correspondingly shaped recess 16 in the enlarged portion 14 of shaft 12, forming a stepped thrust bearing connection between said shafts, as well as a means for maintaining them always in alinement.

Arranged within the chamber 7 and grouped about the drive shaft 11 is an annular series of transmission shafts 17, 18, 19 and 20, which shafts have reduced end portions or journals fitted in bearing openings in the plates 1 and 6. Four such shafts 17, 18, 19 and 20 are shown in the present instance, and each of said shafts, as well as the shaft 11, is provided with a series of spaced disks 21, which disks are formed at angles of 120° with openings 22 for the reception of pins or rods 23 forming crank members or pins between adjacent disks. Any number of disks and crank pins in each working group may be employed, but, in the example shown, five disks are provided on each shaft for the reception of pins extending across the grooves or spaces between adjacent disks so as to provide upon each shaft four groups of pins, of three pins to each group, making in all sixteen working groups of pins of three pins to each group. As shown, the groups of pins on the shaft 11 and 17 to 20, inclusive, are arranged in transverse alinement with each other, thus correspondingly disposing the sets of pins in the spaces between the disks, so that four main groups of pins are employed, arranged at spaced distances apart, one in rear of the other, between the plates 4 and 6, and each including four crank gears, each composed of a pair of disks carrying three crank pins arranged at angles of 120° to each other.

Arranged in cooperation with each main group of crank wheels or disks and the crank pins 23 carried thereby is a working set, group or series of cam levers or dogs 24, each pivotally mounted at one end upon a supporting rod 25, which rods extend from front to rear of the chamber 7 between the plates 4 and 6 and are fitted at their ends in openings in said plates. The cam levers or dogs are arranged between the shaft 11 and the crank disks and pins thereon and the shafts 17, 18, 19 and 20, and the crank disks and pins thereon, each dog being intermittently and periodically movable outward radially by the pins 23 on the crank gears or disks of the shaft 11 for transmitting motion to the crank pins of the crank gears or disks of one of the transmission shafts. Each dog is provided for this purpose with cam faces 26, 27 and 28. In the normal or retracted position of each dog, its surface 26 engages a pin 23, as shown by the top dog in Fig. 2, and then as shaft 11 makes a rotation of 120° in a counter-clockwise direction such pin 23 passes from the cam surface 26 to the cam surface 27 of the dog and moves such dog radially outward so its cam surface 28 engages one of the pins of the crank wheel actuated by said dog, in this instance the top crank wheel of Fig. 2, and by this means motion is transmitted to said crank wheel to transmit a part revolution to shaft 17. While the top dog of the groove which cooperates with shaft 17 is in its idle position, the dog which cooperates with a crank wheel on shaft 18 has its surface 27 engaged by another pin 23 on shaft 11 for outward radial movement thereby and its surface 29 engaging a pin of a crank wheel on shaft 18 for turning the latter while the dog coacting with the crank wheel on shaft 19 will be in a position in which its surface 26 is engaged by the three crank pins on shaft 11 and its surface 29 engaging a crank pin on a crank gear on shaft 19, which pins are at the limit of outward movement along said dog surfaces. At the same time the fourth dog coacting with a crank gear on shaft 20 is disposed in a position in which its surface 27 has just been released from engagement with the pin on shaft 23 engaging the surface 26 of the top dog, while the surface 26 of said fourth dog lies in the path of motion of the pin on shaft 17 which is about leaving the surface 27 of the third dog. The arrangement is thus such that the dogs and coacting sets of crank pins are at different working angles in the rotation of the drive shaft, and each dog is provided with two acting surfaces 26 and 27, for cooperation with a crank pin on shaft 11, and two motion transmitting surfaces 28 and 29, for coaction with crank pins of different transmission gears in its orbit of rotation, so that when two dogs of the series are transmitting motion to two of the crank gears through their surfaces 28 the other two dogs will be transmitting motion to the other crank gears of the series through their surfaces 29, there being just a slight period at each 120° angle when each dog is momentarially idle, so that a plurality of working motions will be transmitted by each dog on each of its orbits of rotation, while at the same time a plurality of dogs will be simultaneously operating for motion transmitting actions. As the crank pins and dogs of the different groups are also at different working angles at different periods, a plurality of working motions will be transmitted from the drive shaft 11 to each transmission shaft on each 120° angle motion of the driving shaft. Through the action of all the groups of crank pins and dogs 32 complete impulses will be transmitted to each transmission shaft on each complete rotation of the drive shaft.

In the embodiment of the invention disclosed in Figs. 5, 6 and 7, the general construction and arrangement of parts is the same as that shown in Figs. 1, 2 and 3, like parts being correspondingly numbered, the difference being in the construction of the cam levers, dogs or pawls 24' which, while similar in arrangement to the levers 24 shown in Figs. 1, 2 and 3, vary in construction there-from in being provided with additional acting surfaces 24ª in the form of bell extensions or portions having pin engaging surfaces 24ᵇ. The arrangement of the parts here is such that while the surfaces 26 and 27 of a lever 24′ of a set or series of levers is being acted upon by a pin 23, at a certain point in the orbit of rotation of the shaft 11, to transmit motion through the surfaces 28 and 29 to a pin 23 of one of the motion transmitting shafts, the portions 24ª—24ᵇ of another lever of the same series engages the pin 23 of another transmission shaft for the transmission of motion thereto, whereby each cam lever simultaneously operates to transmit motion to two transmission shafts at least once on each orbit of rotation thereof.

On shaft 11 is a driving element 30, which may be a driving motor or a pulley from which power is received from another shaft or motor, and shaft 12 may transmit the power directly or indirectly to gearing or other machinery of any sort to be driven thereby. The shaft 11 in Figs. 1, 2 and 3, is connected through a gear train 31, 32, 33 and 34 with the shaft 17, and the shafts 17, 18, 19 and 20 carry pinions 35 which are grouped about and mesh with gear teeth formed on the enlarged portion 14 of the shaft 12, whereby the shaft 12 is positively and continuously driven from the shaft 11 through the above-mentioned transmission gears and is at the same time intermittently driven from the shaft 11 by the intermittent drive mechanism so that any transmission losses due to slippage, torque or other causes in the transmission of power through the positive driving connection will be compensated for and augmented by the forces transmitted by the intermittent drive gearing, so that increased power and, if desired, increased speed may be obtained.

Having thus fully described my invention, I claim:

1. In a power transmitting mechanism, driving and driven shafts, and motion transmitting mechanism between said shafts comprising auxiliary shafts grouped about the driving shaft, a set of gears on each of said shafts, and a plurality of cam elements actuated by the driving shaft and associated with each set of gears, the acting portions of the sets of gears and the associated cam elements being operatively arranged to transmit motion to the transmission shafts at different points in the orbit of rotation of the drive shaft.

2. In a power transmitting mechanism, driving and driven shafts, a set of transmission shafts grouped about the driving shaft, a plurality of transmission gears on each transmission shaft and a coacting set of gears on the driving shaft, a set of cam elements associated with each set of gears, the gears and cam elements being arranged to impart motion intermittently to the transmission shafts at different points in the orbit of rotation of the drive shaft, and gearing between the drive shaft and transmission shafts and between said transmission shafts and the driven shaft.

3. In a power transmitting mechanism, driving and driven shafts, a set of transmission shafts grouped about the driving shaft, a plurality of transmission gears on each transmission shaft and a coacting set of gears on the driving shaft, a set of cam elements associated with each set of gears on the driving and transmission shafts for intermittently transmitting motion from the former to the latter, each cam element being provided with surfaces for simultaneously acting upon gears of two transmission shafts and the sets of cam elements being arranged for coaction with the gears to transmit motion to the transmission shafts at different points in the orbit of rotation of the drive shaft, and positive gearing between the drive shaft and one of the transmission shafts and between the transmission shafts and the driven shaft.

In testimony whereof I affix my signature.

ANDREW K. STOHL.